United States Patent Office 3,024,087
Patented Mar. 6, 1962

3,024,087
PROCESS FOR THE PREPARATION OF NIOBIUM OXIDE
Bernard Desbois, Saint Jean de Maurienne, Savoie, France, assignor to Pechiney, Compagnie de Produits Chimiques et Electrometallurgiques, Paris, France, a corporation of France
No Drawing. Filed June 30, 1959, Ser. No. 823,854
Claims priority, application France July 11, 1958
3 Claims. (Cl. 23—140)

The present invention, which is based on applicant's researches, relates to a process for the preparation of pure niobium oxide and relates, more particularly, to the preparation of niobium oxide as a by-product of the preparation of tantalum from its ores.

It is already known to produce pure tantalum pentoxide from tantalum ores, for example, tantalite and columbotantalite, by treating aqueous hydrofluochloric acid solutions of these ores in countercurrent fashion with an oragnic solvent, such as methyl ethyl ketone. The niobium and other impurities, among others, silicon, manganese, titanium, iron, aluminum, calcium, tin, etc., remain in such an aqueous solution. There exists other known processes for separating tantalum from its impurities, but the one briefly described above is the most generally used at the present time.

It is further known to separate niobium from its mixtures with other metals, most frequently, with metals of the III to V groups of the periodic system, by contacting their salts with anionic or cationic ion exchange substances. For example, niobium is complexed in a form that is adsorbed by an anionic resin, and is then recovered in the form of one of its salts by elution with an aqueous acid solution, for example, hydrochloric and/or hydrofluoric acid.

Applicant's researches have established that such a niobium purification process presents serious drawbacks. First of all, when aqueous solutions of salts of niobium and other metals, among them iron, are prepared and the niobium is complexed in anionic form, for example as $NbF_6^-$, a portion of the iron will also be complexed in the anionic form; as a result, the adsorption by the anion exchanging substances will not be selective, and a certain amount of iron will be fixed together with the niobium. Moreover, when elution is carried out with an aqueous solution of an acid, for example, hydrochloric and/or hydrofluoric acid, the elution is not complete and part of the niobium, in the anionic form, will remain adsorbed by the ion exchange substance. On regenerating the latter by means of an aqueous alkaline solution, for example, caustic soda, the niobium will pass back into the cationic form but will definitely be retained by the ion exchange substance, poisoning it in some fashion and causing a loss in its activity.

By the present invention, applicant has developed a process which eliminates the above stated drawbacks.

More particularly, the present invention relates to a process for the preparation of pure niobium oxide from aqueous solutions of compounds of niobium present in the anionic form, and which solutions also contain compounds of metals of the III, IV, V and VIII groups of the periodic system, by contacting the solutions with an ion exchange substance having an anionic reaction; the process is characterized in that the metal or metals adsorbed in the anionic form by the ion exchange substance are eluted with an aqueous solution of a neutral salt.

Other objects of the invention will be disclosed in the course of the following description.

Applicant has established that iron in the anionic form—which, as stated above, is adsorbed by the anionic reacting ion exchange substance at the same time as the niobium, and is likewise complexed in the anionic form—is totally eluted before the niobium. It will thus be easy to check (control) the removal of the iron by any known method of qualitative analysis.

Applicant has further found that if use be made of an aqueous solution of a neutral salt as eluent, it is possible, on the one hand, to recover the niobium out of the collected effluent and, on the other, to regenerate the anionic exchnge substance. In contrast with the known processes using first, an acid eluent and, then, an alkaline regenerating agent, applicant accomplishes both results above mentioned in a single operation without reducing in any way the subsequent activity of the ion exchange substance.

The anionic reacting ion exchange substances used are resinous compounds, and the basic character of the anion exchange resin is derived from polyamine or quaternary ammonium groups. Examples of such compounds are, without limitation, those known by the trade names Amberlite IR4B and Amberlite IRA–400, manufactured by Rohm and Haas Company, Philadelphia, Pennsylvania. The first of these is described in a pamphlet of Rohm and Haas Co. entitled Amberlite IR-4B Form 20R M-3-47 (revised December 1954) which states: "Amberlite IR-4B is a weak base, phenolformaldehyde-type anion exchange resin." The second is described in a pamphlet of Rohm and Haas Co. entitled Amberlite IRA–400 Form 20R M-3-48 (revised December 1954) which states: "Amberlite IRA–400 is a strongly basic, quaternary amine-type anion exchange resin" and is covered by Patent 2,591,573. These resins are also described in the book "Ion Exchange Technology," by Nachod and Schubert (1956), on pages 24 and 25.

According to a preferred embodiment of the invention, use is made of an aqueous solution of sodium chloride as the eluent.

The following example, which is not given by way of limitation, will serve to illustrate the process which is the object of the present application.

*Example*

400 cm.$^3$ of an aqueous hydrofluoric solution, having an acid concentration $C_{HF}$ between 0.6 and 1.5 N, and containing,

| | |
|---|---|
| Nb | About 1 to 2 g./100 cm.$^3$ |
| Ta | About 0.1 g./100 cm.$^3$ |
| Fe | About 13.8 g./100 cm.$^3$ |
| Mn | About 9.5 g./100 cm.$^3$ |
| Ti | About 1.1 g./100 cm.$^3$ |
| Si | About 0.8 g./100 cm.$^3$ |
| Cu | About 3.2 g./100 cm.$^3$ |
| Al | About 0.8 g./100 cm.$^3$ |
| Sn | About 5.1 g./100 cm.$^3$ | are contacted with one liter of an anionic reacting ion exchange resin by filtration under normal pressure.

The resin is then washed with strictly neutral distilled water until all traces of the solution are removed.

All of the complexed niobium and a small quantity of iron, of the order of 1%, are retained on said resin.

Elution is then carried out with a solution of sodium chloride having an NaCl concentration of between 1.5 and 3 mols/liter. The iron is entrained first and its removal is checked by qualitative analysis using, for example, thiocyanate.

Once all iron has been separated, the niobium is recovered and niobium hydroxide is then precipitated out of the eluate by means of ammonia. The hydroxide is then washed, dried and calcined.

The niobium oxide thus obtained ($Nb_2O_5$), when submitted to spectrographic analysis, is found to be pure; any impurities contained therein are only on the border of spectrographic detection.

The regenerated resin is washed with strictly neutral distilled water and can be used immediately in a new processing cycle. It has not undergone any reduction in its activity.

While in the foregoing example there has been mentioned the use of an aqueous solution of sodium chloride as the neutral eluent, it will be understood that other neutral aqueous eluents can be employed, as aqueous solutions of KCl, KBr, NaBr, NaI, NaF, KF, and other halides, or neutral phosphates of alkali or alkaline earth metals, sulfates of such metals, or mixtures of these compounds.

I claim:

1. Process of preparing niobium oxide, in a pure state, from an aqueous solution of a niobium compound wherein the niobium is present in anionic form, and which solution also contains a compound of at least one other metal from the III, IV, V and VIII groups of the periodic system, comprising the steps of: contacting the solution with a resinous ionic exchange substance having an anionic reaction, whereby the niobium is adsorbed in anionic form by the ion exchange substance, and thereafter treating the ion exchange substance with a neutral eluent consisting of an aqueous solution of a salt selected from the group consisting of alkali and alkaline-earth metal halides, phosphates, sulfates, and mixtures of these compounds, whereby the adsorbed niobium is removed in the eluate, and the ion exchange substance is simultaneously regenerated.

2. Process according to claim 1, wherein the solution contains a compound of iron in anionic form which is partially adsorbed by the ionic exchange substance and wherein, upon treatment with the eluent, the iron is selectively removed initially, and the niobium is subsequently removed substantially uncontaminated with iron.

3. Process according to claim 1, wherein the eluent is an aqueous solution of sodium chloride, the eluate is treated with ammonia to thereby precipitate niobium hydroxide, and the said hydroxide is calcined to produce pure niobium oxide.

References Cited in the file of this patent

UNITED STATES PATENTS 2,285,750    Swain ------------------ June 9, 1942
2,559,529    Bauman ---------------- July 3, 1951

OTHER REFERENCES

Kraus et al. in "Journal of the American Chemical Society," vol. 73, pages 9–13 and 2900–2902.